Sept. 22, 1931.   A. F. VICTOR   1,824,519
REEL MOUNTING FOR MOTION PICTURE PROJECTORS
Filed April 24, 1930   2 Sheets-Sheet 2
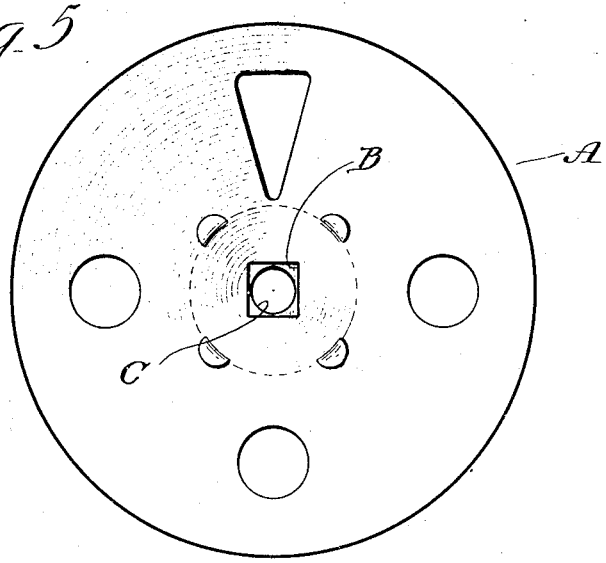
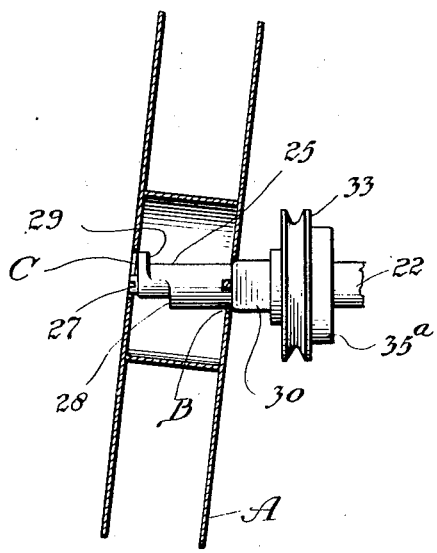 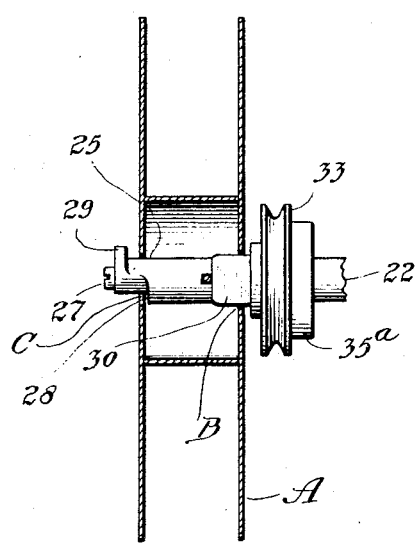
INVENTOR.
Alexander Ferdinand Victor
BY
ATTORNEY.

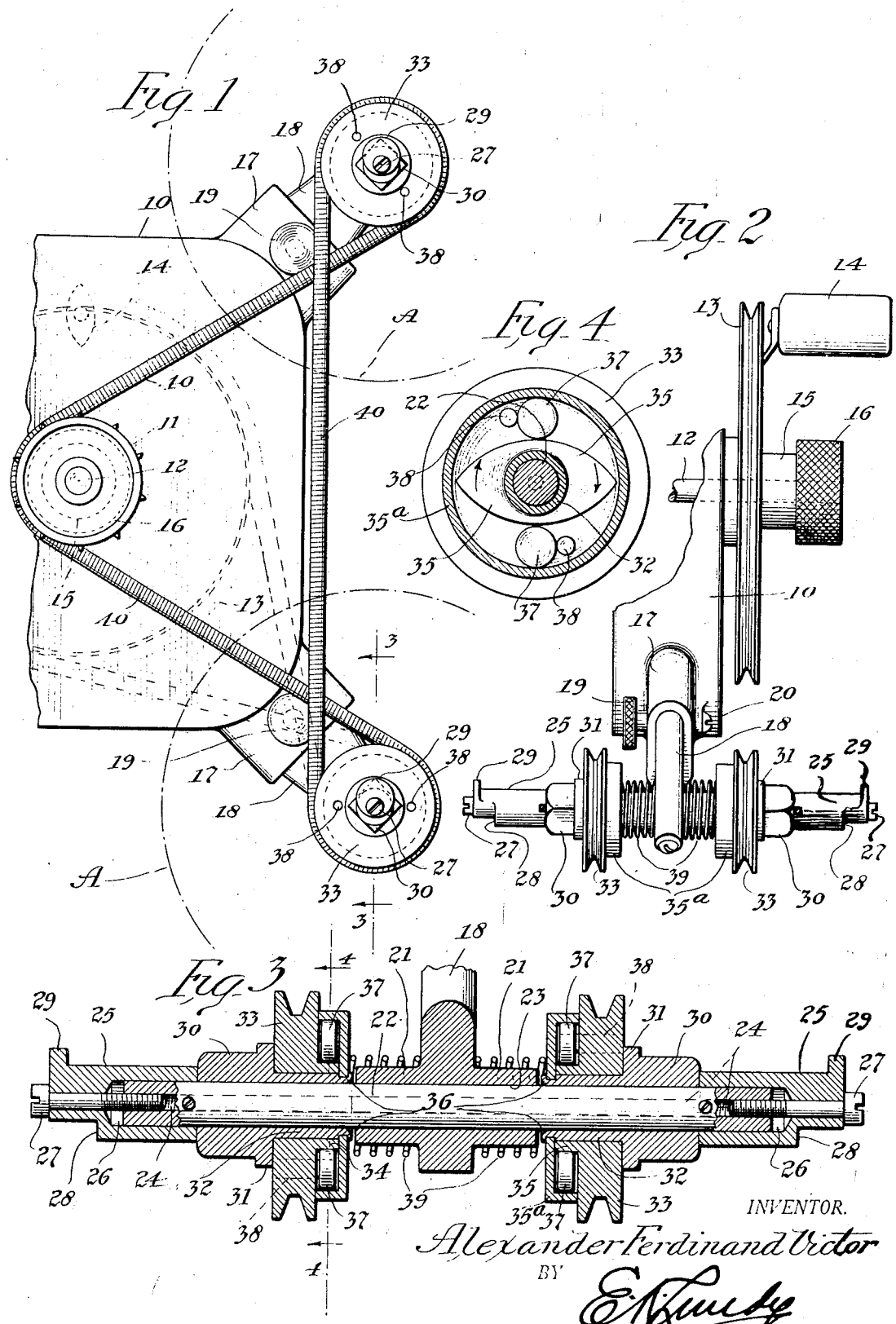

Patented Sept. 22, 1931

1,824,519

UNITED STATES PATENT OFFICE

ALEXANDER FERDINAND VICTOR, OF NEW YORK, N. Y.

REEL MOUNTING FOR MOTION PICTURE PROJECTORS

Application filed April 24, 1930. Serial No. 446,997.

My present invention relates to motion picture apparatus and more particularly to means for mounting the reels of film spools upon a projecting apparatus.

As is well known the reels or film spools that are employed in motion picture apparatus are provided with spindle openings upon opposite sides to receive the spindle upon which or with which the device rotates, and these spindle openings are made of different shapes upon opposite sides of the reels for the purpose of preventing the users of the apparatus mounting the reels incorrectly upon the spindles. It has also been the practice to provide a latch or retainer to prevent accidental dislodgment of the reel while mounted on a spindle. It has also been the practice to provide a spindle or spindles upon a rewinding machine, that is separate from motion picture apparatus, thereby involving an additional device and an added expense to the outfit.

In my present device I have provided a spindle disposed transversely to the path of movement of the film, upon which the film being projected may have its reels mounted without the use of a latch, and the spindle is so constructed that it will correctly engage the differently shaped spindle openings of the reels and cooperate with them in the manner intended by the manufacturer of the reels. In my present arrangement I provide a spindle construction that permits a reel of film to be fed through the projection apparatus in the usual manner and at the same time another reel of film may be rewound upon the same apparatus, either manually or mechanically during the projecting operation. In other words, a single pair of spindles provides for the feeding and projecting of one strip of film and the rewinding of another strip of film, the two operations being conducted simultaneously.

I have numerous objects in view, among which are the provision of a reel mounting device that is novel as well as sturdy in construction, is dependable and effective in operation and which is economical to manufacture. I prefer to carry out my invention and to accomplish the numerous objects thereof in substantially the manner hereinafter fully described and as more particularly pointed out in the claims, reference being herein made to the accompanying drawings that form a part of this specification.

In the drawings:

Figure 1 is a vertical side elevation of a portion of a motion picture projector showing the arrangement of the film spool mountings.

Figure 2 is a front view of the lower portion of the structure shown in Fig. 1 and showing the lower reel or film spool spindle in longitudinal elevation.

Figure 3 is a longitudinal sectional view, slightly enlarged, the view being taken on line 3—3 of Fig. 1.

Figure 4 is a view in elevation of the clutch and taken on line 4—4 of Fig. 3.

Figure 5 is a side elevation showing a film spool or reel mounted upon one of the spindles, the spindle being in edge view.

Figure 6 is a schematic view showing the manner of placing or removing the reel on the spindle, the latter being in longitudinal elevation.

Figure 7 is a view similar to Fig. 6 showing the film reel or spool in operative position upon the spindle.

The drawings are somewhat schematic for the purpose of illustrating a typical or preferred embodiment of my invention, and in said drawings similar reference characters have been employed to designate like parts wherever they appear throughout the views.

In the drawings 10 represents a portion of the projecting apparatus upon one side of which there is a feed sprocket 11 mounted upon a shaft 12 that passes transversely through the portion 10 of the projector and upon its opposite end there is mounted a large pulley 13 that may be manually rotated by a handle 14. The pulley 13 is capable of free rotation upon the shaft 12 but may be connected thereto so as to rotate therewith by means of a clutch mechanism 15 that is not shown in detail but which is operated by means of the milled head 16. In the event the projector is being driven by motor and it is desired to re-wind a reel of film, this may be done manually by releasing the clutch and revolving the pulley 13 by its handle, or by operating the clutch the pulley 13 will be made fast on the shaft 12 and the motor which is driving the latter will also perform the re-winding operation by rotating the pulley 13.

Stubs or sockets 17 project radially from the corners of the portion 10 of the projector and provide means for mounting the radially projecting arms 18 that carry the upper and lower reel mounting spindles. Said arms 18 are preferably elongated and may be maintained in different positions by means of set screws 19 and they are prevented from being withdrawn from the sockets by stop screws 20.

The reel mounting spindles at the top and the bottom are of practically the same construction and therefore only one will be described, the same being the lowest spindle which is illustrated in detail in Figs. 2 and 3.

The outer end of the arm 18 is provided with oppositely projecting transverse stubs 21 having a continuous bore 23 in which there is mounted the elongated spindle rod 22 that projects upon each side of the arm 18 and said spindle rod is provided with a longitudinal axial bore 24 that is threaded at its opposite ends. A portion of the reel spindle structure also consists of the extension 25 that is of larger diameter than the end portion of the rod 22 and has a socket 26 bored into one end so that the extension will fit upon the adjacent end portion of the rod 22. This extension 25 is secured in position by a screw 27 that passes through the end of the extension and screws into the threaded end of the bore 24 of the rod. The main portion of the spindle extension is a continuous cylinder and at its outer end it has a stepped portion or shoulder 28 that extends around only the lower segment as seen in the drawings, while at the extreme end of the extension spindle there is a cam disk or flange 29 that projects away from the surface of the extension a short distance so that a lip or stop is provided at the end of the structure.

In placing the reel A upon the spindle the squared hole B of the reel is first inserted over the flange and stepped portion and the spool is moved backwardly until the circular opening C at the other side of the spool is opposite the end of the spindle. The circumference of the stop disk or flange 29 and the portion of the spindle extension beyond the shoulder 28 preferably forms a cylinder of slightly less diameter of the round hole in the spool so that by tilting the spool in the manner shown in Fig. 6 the round hole will pass over the flange or cam disk 29, after which the spool is returned to a vertical position, as shown in Figure 7, so that the circular hole in the reel rides on the surface of the spindle inside the stop or cam disk 29.

This prevents lateral displacement or movement of the reel or spool in a true transverse direction that is parallel to its axis or the axes of the spindle, and the stepped portion permits the tilting of the spool during the mounting or removing operation.

A block 30 of squared or of irregular section is mounted to rotate freely upon the inner portion of the rod between the inner end of the spindle extension 25 and the stubs 21 of the rod. Adjacent the squared portion of the block there is a circular flange 31 and the remaining portion of the block is reduced in diameter to provide an axial hub 32 to receive a grooved pulley 33.

The pulley 33 rotates upon the hub 32 of the block and it is provided with a hub 34 which at diametrically opposite points has clutch cam formations 35. The adjacent end of the hub 32 of the block is provided with a small shoulder by reducing the end portion of the hub to receive a cup-shaped housing 35$^a$ which is secured against the shoulder by the extended portion of the hub being reamed over as at 36 to secure the housing 35$^a$ to the hub 32. Before the assembly of the housing the small cylindrical rollers and disks 37 are inserted in the space between the hub 34 and the lateral wall of the housing and the pulley is provided with concentrically arranged lateral pins or stops 38. This structure forms a clutch which connects the rotatable block 30 to the pulley and causes the latter to drive the block when rotating in one direction and to run free when rotated in the opposite direction.

In the operation of the clutch the parts are clamped into operative relation by reason of the fact that the clutch cam 35 at its edges engages the rollers 37 and wedges them against the lateral wall of the housing, as will be understood by reference to Fig. 4. The pins or stops 38 prevent the disks moving in the reverse direction which would wedge them with the cams and housing wall. In order to prevent lateral play or vibration a coiled expansion spring 39 is placed around the stub 21 between the arm 18 and the clutch housing which retains the parts in intimate assembly but free to rotate and causes the outer end face of the block 30 to engage the inner or adjacent end of the spindle extension 25 and avoid rattle. The structure and parts of the spindle device hereinbefore described are duplicated upon the portion of the spindle-rod on each side of the arm 18 as will be seen by the reference characters.

A pulley, not shown, is secured to the shaft 12 alongside the sprocket 11 and a suitable belt 40 engages this pulley and the pulleys 33 of the upper and lower spindle structures. A similar belt connects the large pulley 13 and the alining pulley on the spindle rod 22 so that when the shaft 12 is rotated, either by motor or through the handle 14, the pulley on said shaft 12 will drive the belt 40 in a direction to rotate the feed and take-up pulleys of the film being projected, shown respectively at the upper and lower portions of Fig. 1. At the same time, if the rewind clutch 15 has been set the pulley 13 will drive a rewind pulley that is alined with it and the rewinding operation may be accomplished simultaneously with the projection. It will be seen that a very dependable structure has been provided that is capable of utilizing the film spools already on the market and having differently shaped spindle openings upon their opposite sides, and the spool may be readily assembled or removed from my spindle structure without having to release the latch.

It will also be noted that the takeup and rewind spools or reels may be mounted upon the lower spindle structure, while the feed spool and the free unwinding spool may be mounted upon the upper spindle structure; thus two spindle structures provide the mechanism for the two operations hereinbefore described.

It will be. obvious that changes may be made in structures herein disclosed without departing from the principles involved. It will also be understood that the drawings and detailed description herein given are for the purpose of clearness of understanding only and no unnecessary limitations should be understood therefrom, but the appended claims should be construed as broadly as permissible in view of the prior art.

What I claim is:

1. A reel mounting comprising a spindle one end of which is shouldered and has a lateral retainer flange, and a rotatable member on the opposite end of said spindle and of different cross-section form than said spindle.

2. A reel mounting comprising a spindle one end of which has a shoulder on one segment and a lateral retainer on the opposite segment, and a rotatable member on the opposite end of said spindle and of different cross-section form than said spindle.

3. A reel mounting comprising a spindle one end of which has a semi-circular shoulder and a lateral segmental shaped rim of substantially the same diameter as said spindle, and a rotatable member on the opposite end of said spindle and of different cross-section form than said spindle.

4. A reel mounting comprising a spindle one end of which is reduced and shouldered and has a lateral retainer flange projecting laterally away from its circumferential surface.

5. A reel mounting comprising a spindle one end of which is reduced to provide a shoulder on one segment and has a lateral retainer on the opposite segment projecting laterally away from its circumferential surface.

6. A reel mounting comprising a spindle one end of which is reduced to provide a semi-circular shoulder and a lateral rim of circular outline and of substantially the same diameter as said spindle which rim projects laterally away from the surface of the spindle.

7. A reel mounting comprising a spindle having a smooth cylindrical surface, the end of said spindle having stepped portions upon opposite segments, one of said portions being extended away from the surface of the spindle.

8. A reel mounting comprising a spindle having a smooth cylindrical surface, the end of said spindle having stepped portions upon opposite segments, one of said portions being formed by providing a shoulder on said spindle.

9. A reel mounting comprising a spindle having a smooth cylindrical surface, the end of said spindle having stepped portions upon opposite segments, one of said portions being formed by a shoulder on said spindle and the other portion being extended away from the spindle surface.

10. A reel mounting comprising a spindle having a reduced portion adjacent its outer end to provide a shoulder, and a lateral segmental shaped rim adjacent and beyond the shoulder, said rim and the reduced spindle portion being of substantially the same diameter as the body of the spindle.

Signed at New York, in the county of New York, and State of New York, this 11th day of March, 1930.

ALEXANDER FERDINAND VICTOR.